United States Patent
Smith et al.

(10) Patent No.: US 8,429,513 B2
(45) Date of Patent: Apr. 23, 2013

(54) LOADING SECURE CODE INTO A MEMORY

(75) Inventors: David Smith, Bristol (GB); Andrew Marsh, Bristol (GB)

(73) Assignee: STMicroelectronics (Research & Development) Limited, Buckinghamshire (GB)

(*) Notice: Subject to any disclaimer, the term of this patent is extended or adjusted under 35 U.S.C. 154(b) by 936 days.

(21) Appl. No.: 12/497,240

(22) Filed: Jul. 2, 2009

(65) Prior Publication Data

US 2011/0004807 A1 Jan. 6, 2011

(51) Int. Cl.
*G08C 25/00* (2006.01)
*H03M 13/00* (2006.01)

(52) U.S. Cl.
USPC .......................................... 714/799

(58) Field of Classification Search .............. 714/25, 714/31.3, 725, 746, 799; 713/189, 191
See application file for complete search history.

(56) References Cited

U.S. PATENT DOCUMENTS

| 5,090,015 A | * | 2/1992 | Dabbish et al. | 714/733 |
| 7,043,495 B1 | * | 5/2006 | Green et al. | 707/699 |
| 7,225,373 B1 | * | 5/2007 | Edwards et al. | 714/725 |

* cited by examiner

*Primary Examiner* — Shelly A Chase
(74) *Attorney, Agent, or Firm* — Wolf, Greenfield & Sacks, P.C.

(57) ABSTRACT

A method of verifying the integrity of code in a programmable memory, the method including: receiving the code from an insecure memory; generating error detection bits for the code as it is received from the insecure memory; storing the code and the error detection bits in the programmable memory; and verifying the integrity of the code stored in the programmable memory by performing an authentication check on the code and the error detection bits stored in the programmable memory.

39 Claims, 7 Drawing Sheets

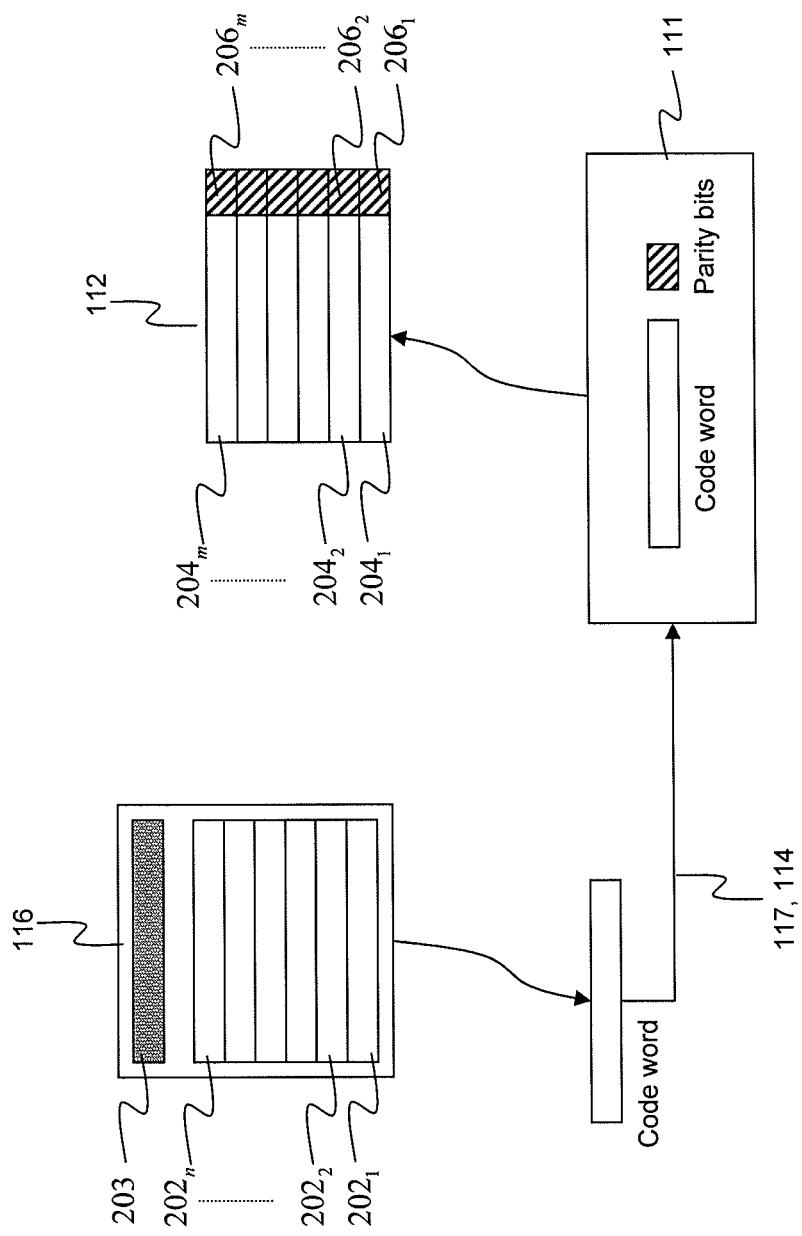

LOADING SECURE CODE INTO A MEMORY

FIELD OF THE INVENTION

This invention relates to loading secure code into a memory from an untrusted source.

BACKGROUND OF THE INVENTION

In some computer systems it is often important to verify the authenticity of code before it is executed. In such computer systems code might only be executed if it is known to be from a trusted source. The computer system requires a mechanism of verifying that code is from a trusted source, rather than an untrusted source, before executing the code.

For example, digital TV set top boxes (STBs) are designed to decode content streams transmitted by broadcasters, and display them on a television screen. Many of these content streams are transmitted in an encrypted format, and they have to be decrypted before they can be displayed. Only true subscribers who have paid for the service are given permission to decrypt and view the content. Security features on the STB prevent non-subscribers from being able to decrypt and view the content streams. For this system to work effectively, it must be ensured that the STB is not bypassing the security features. Most STBs use programmable microprocessors, so in order to ensure that the security features are not bypassed, it is necessary to verify that code running on the microprocessors has come from a trusted source.

One method of ensuring the authenticity of code is to encode the code into a Read Only Memory (ROM) embedded in a chip of a computer system. This ensures the security of the code since it is very difficult to modify code stored in ROM. Therefore, chips can be supplied from a trusted supplier with code prestored in the ROM, such that the computer system can trust the code stored in the ROM.

However, storing code in ROM requires the code to be fixed at the time of manufacture, such that it cannot be changed at a future date. Storing code in this rigid manner in ROM is often undesirable, as developments or improvements to the code cannot be made after manufacture.

In order to allow developments or improvements to be made to code after manufacture, the code can be loaded from an external programmable memory. In this way, new developments or improvements to the code could be loaded into the external memory, and then loaded into the chip from the external memory. However, such a system would be less secure than that in which ROM on the chip is used because the code stored in the external memory might not come from a trusted source or the external memory could be replaced with a different, untrusted memory. In either of these ways, untrusted code could be loaded into the chip.

It is an aim of the present invention to provide a solution to the above mentioned problems of ensuring the security of code loaded into a chip.

SUMMARY OF THE INVENTION

In a first aspect of the invention there is provided a method of verifying the integrity of code in a programmable memory, the method comprising: receiving the code from an insecure memory; generating error detection bits for the code as it is received from the insecure memory; storing the code and the error detection bits in the programmable memory; and verifying the integrity of the code stored in the programmable memory by performing an authentication check on the code and the error detection bits stored in the programmable memory.

The method may further comprise: if the integrity of the code is verified, fetching the code and error detection bits from the programmable memory; checking that the fetched error detection bits are correct for the fetched code; and if the fetched error detection bits are correct, executing the fetched code.

In a second aspect of the invention there is provided a chip comprising: means for receiving code from an insecure memory; means for generating error detection bits for the code as it is received from the insecure memory; a programmable memory for storing the code and the error detection bits; and means for verifying the integrity of the code stored in the programmable memory by performing an authentication check on the code and the error detection bits stored in the programmable memory.

There is also provided a system comprising: a chip as described herein above; and the insecure memory.

In embodiments, after code has been written into a programmable memory, such as a RAM, on a chip, it is ensured that the code is the same as that in an external memory from which the code has been loaded. This is achieved with the use of an authentication check and the use of error detection bits, such as parity bits. If the code is altered as it is written into the RAM then the parity bits will not be correct for the code stored in the RAM. This provides protection against some causes of errors, such as glitches and brown-outs. In this way, secure code can be loaded into an on-chip memory from an off-chip source and the authenticity of the code can be verified. The parity bits ensure that modification of the code during or after the loading process is detected.

BRIEF DESCRIPTION OF THE DRAWINGS

For a better understanding of the present invention and to show how the same may be put into effect, reference will now be made, by way of example, to the following drawings in which:

FIG. 2a is diagram representing a method of loading a code word from an insecure memory to a code RAM according to a preferred embodiment;

DETAILED DESCRIPTION

Figure 1:
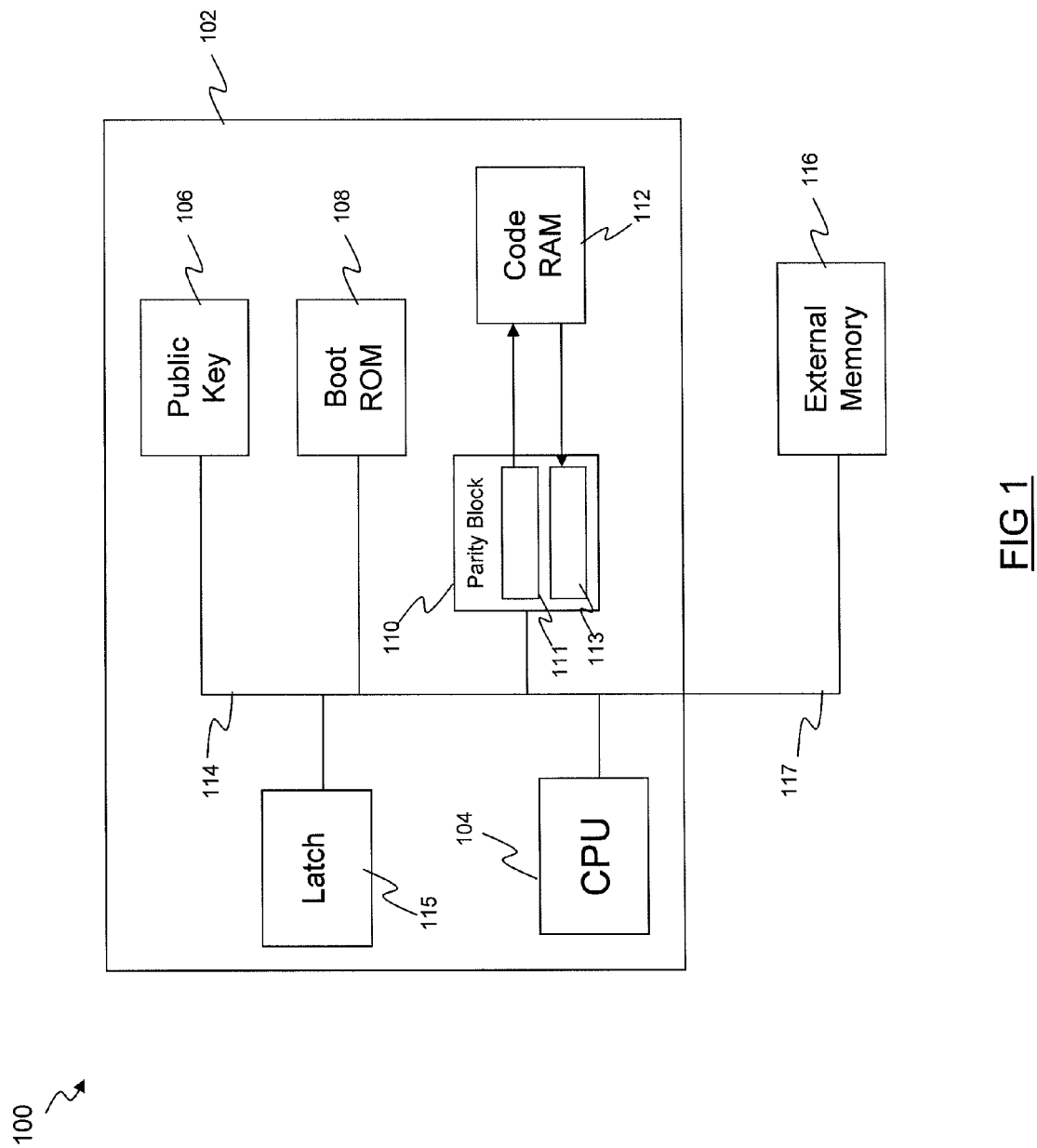
FIG. 1 is a schematic diagram representing a system according to a preferred embodiment of the present invention.

Reference is first made to FIG. 1, which illustrates a computer system 100 according to a preferred embodiment. The system 100 comprises a chip 102 and an external memory 116. The external memory 116 is external to the boundary of the chip 102 (off-chip memory), and is thus not secure. It is referred to herein as an insecure memory, meaning that it is accessible to third parties.

The chip 102 comprises a CPU 104, a public key 106, a boot ROM 108, a parity block 110, a code RAM 112, a latch 115 and a bus 114. The parity block 110 comprises a parity generation block 111 and a parity checking block 113. The bus 114 couples the CPU 104, public key 106, boot ROM 108 and parity block 110 to each other. The code RAM 112 is coupled to the parity block 110. The insecure memory 116 is coupled to the bus 114 on the chip 102, via an external link 117.

Code can be stored in the insecure memory 116 which is to be loaded into the code RAM 112 and executed by the CPU 104 on the chip 102. In preferred embodiments the insecure memory 116 is capable of receiving updated code, which is supposed to come from a verified source. Because the code is loaded into the RAM 112 from the insecure memory 116, the code executed by the CPU 104 on the chip 102 can be updated when a new version of the code has been released by supplying the new code to the insecure memory 116, or by replacing the insecure memory with a new insecure memory. The new code can then be loaded into the code RAM 112 from the insecure memory 116 as described in more detail below. Although in the illustrated embodiment the insecure memory 116 is shown as external to the chip 102, in some embodiments, the insecure memory 116 may reside on the same chip as the other elements depicted in FIG. 1. It could still be insecure in the sense that it is accessible to unverified third parties. The code RAM 112 could be any type of programmable memory into which the code from the insecure memory 116 can be loaded. In this context programmable means it can be written or overwritten without a flash or burn process, i.e. away from the point of manufacture.

The CPU 104 is designed to boot directly from the Boot ROM 108. The code in the ROM 108 handles the booting and checking process described below. Two sets of code run on the CPU 104: (i) "Boot code" which is stored in the Boot ROM 108 on the chip 102 and which is programmed at design or manufacture; and (ii) "Application code" which is initially stored in the insecure memory 116, but which is then copied into the Code RAM 112 before being executed by the CPU 104.

Figure 2:
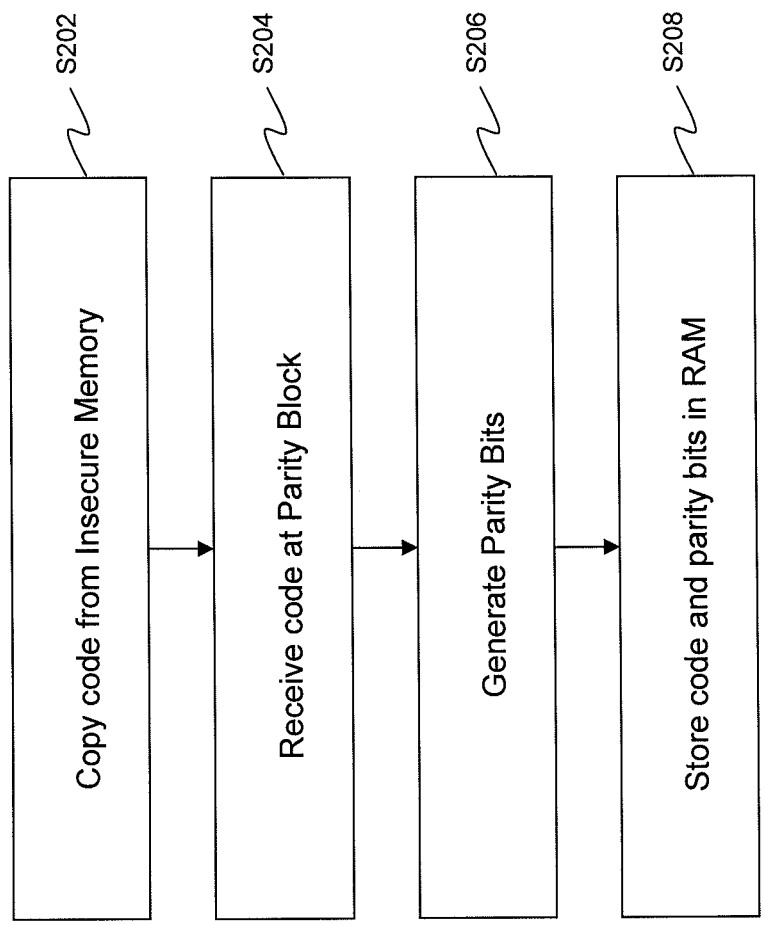
FIG. 2 is a flow chart of a process for loading code into a RAM according to a preferred embodiment.

With reference to FIGS. 1 and 2 there is now described a method for loading code into the code RAM 112 from the insecure memory 116 according to a preferred embodiment.

In step S202 the CPU 104 executes code stored in the boot ROM 108. The Boot code executed from the boot ROM 108 includes code instructing the CPU 104 to copy Application code from the insecure memory 116 to the code RAM 112. Therefore, Application code is retrieved from the insecure memory 116.

In step S204 the Application code is received via the link 117 at the parity block 110. In step S206 the parity generation block 111 of the parity block 110 generates extra bits for each word of the received Application code. The extra bits may be parity bits, or any other type of error detection bits which may be used to verify the integrity of the code. From hereon the extra bits will be referred to as parity bits, but it would be apparent to a skilled person that any other suitable error detection bits may be used instead of parity bits.

In step S208 the Application code and the generated parity bits are stored in the code RAM 112, each fetched word of Application code being stored with associated parity bits.

FIG. 2a shows the insecure memory 116 including a plurality of words $202_1$ to $202_n$ of code and a code signature 203. The code is stored in the insecure memory 116 and the code RAM in code words. The term "code word" is used in this specification to mean a number of bits of code which are accessed in one RAM access operation. Therefore in one fetch cycle, one code word can be accessed from the code RAM 112. The size of a code word is not necessarily dependent upon the size of individual instructions in the code. The size of a code word is dependent upon the characteristics of the code RAM 112, and in particular, the number of bits of code that can be accessed in each access cycle. When the code is loaded into the chip a code word of the code is fetched from the insecure memory 116 and passed to the parity generation block 111 in the parity block 110 via the link 117 and the bus 114. The parity generation block 111 generates error detection bits for each fetched code word from the insecure memory 116. The generated error detection bits are stored in the code RAM 112 with the instruction. In preferred embodiments, a fetched code word fetched in a fetch cycle may include any number of instructions of the code. The parity bits are calculated on a per code word basis, rather than on a per instruction basis. In this way the parity of each fetched code word can be stored in the code RAM 112 with the corresponding code word, irrespective of how the code words correspond to instructions of the code. FIG. 2a shows the code RAM 112 including a plurality of words $204_1$ to $204_m$ fetched from the insecure memory 116 stored with corresponding error detection bits $206_1$ to $206_m$ generated in the parity block 110.

In other, less preferred embodiments, the error detection bits could be generated on a per-instruction basis. However, in these embodiments, the parity checking logic would be required to understand the CPU instruction sizes.

With further reference to FIG. 2a, the code signature 203 has been calculated by calculating the parity bits for the application code in the insecure memory 116, then calculating a hash value of the application code plus parity bits, then encrypting the hash value using a private key. The hash value is preferably generated using the "Secure Hashing Algorithm" (SHA), and then is preferably encrypted using a "Rivest, Shamir, and Adleman" (RSA) algorithm using the private key which corresponds to the public key 106.

Figure 3:
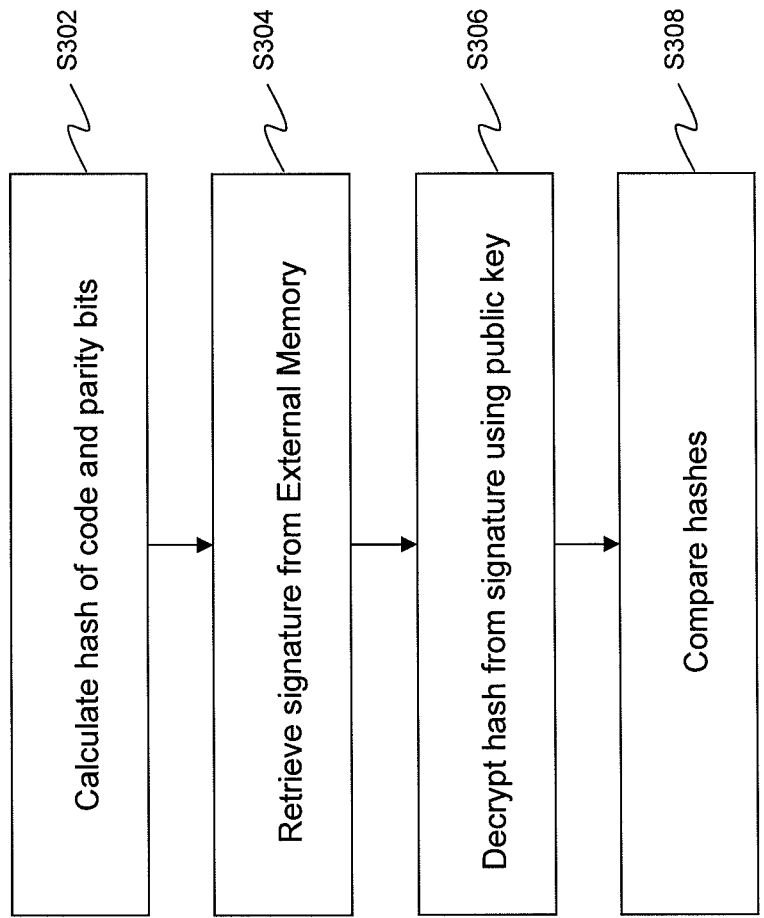
FIG. 3 is a flow chart of a process for performing a signature check on code stored in a RAM according to a preferred embodiment.

With reference to FIG. 3 there is now described a method of performing an authentication check on code once it is stored in the code RAM 112 according to a preferred embodiment. In the preferred embodiment described below, the authentication check is a signature check. In other embodiments, other authentication checks may be used.

One way to improve the security of a computer system when loading code into a programmable memory on a chip from an external memory is to check the code loaded into the programmable memory. A signature check using an asymmetric key algorithm such as a public key-private key cryptography scheme may be used. In such schemes, a private key is stored at a trusted external memory and a corresponding public key is stored in a computer system that is to receive the code from the trusted external memory. A digital signature is computed for the code using the private key and then the code and the digital signature are sent together to the computer system. Digital signature schemes have the property that signatures can only be computed with the knowledge of the private key. To verify the authenticity of the code, the computer system uses the corresponding public key. The code is only allowed to be executed in the computer system if the authenticity of the code received from an external memory is verified, indicating that the external memory is a trusted source.

In step S302 the CPU 104 on the chip 102 calculates a hash of the Application code, including the parity bits, stored in the code RAM 112, using the same hashing algorithm as used to generate the hash in the code signature 203. In other words, the code and the parity bits are used to calculate the hash. In preferred embodiments, this hash is a Secure Hashing Algorithm (SHA) hash of the Application code plus parity bits.

In step S304 the code signature 203 is received at the chip 102 from the insecure memory 116. The code signature 203 consists of an encrypted hash value.

In step S306 the code signature 203 received from the insecure memory 116 is decrypted using the public key 106 stored on the chip 102 to produce a hash value. In step S308 the hash generated in step S302 and the hash decrypted in step 306 are compared at the CPU 104 on the chip 102 to verify the authentication of the Application code stored in the code RAM 112 as coming from a trusted source. If the two hashes match then the private key used to encrypt the code signature 203 stored in the insecure memory 116 can be assumed to correspond with the public key 106 stored on the chip 102. This gives basis for chip 102 to trust the code received from the insecure memory 116.

In preferred embodiments, when the chip 102 is initialized, data is initially allowed to be read from and written to the code RAM 112, but the CPU 104 is not allowed to execute the code stored in the code RAM 112. So while the Application code is loaded from the insecure memory 116 into the code RAM 112, no code can be executed from the code RAM 112. However, once the code RAM 112 has finished loading and been authenticated as described above then access to the RAM 112 is switched such that the CPU 104 may execute the code stored in the code RAM 112, but data is no longer allowed to be written to the code RAM 112. Therefore, once the code RAM 112 has been loaded with the Application code and authenticated, it acts as a read only memory. This provides extra security to the system and trust in the Application code stored in the code RAM 112 because it ensures that the data in the code RAM 112 cannot be altered once the Application code has been loaded into the code RAM 112 and authenticated as being from a trusted source.

Figure 4:
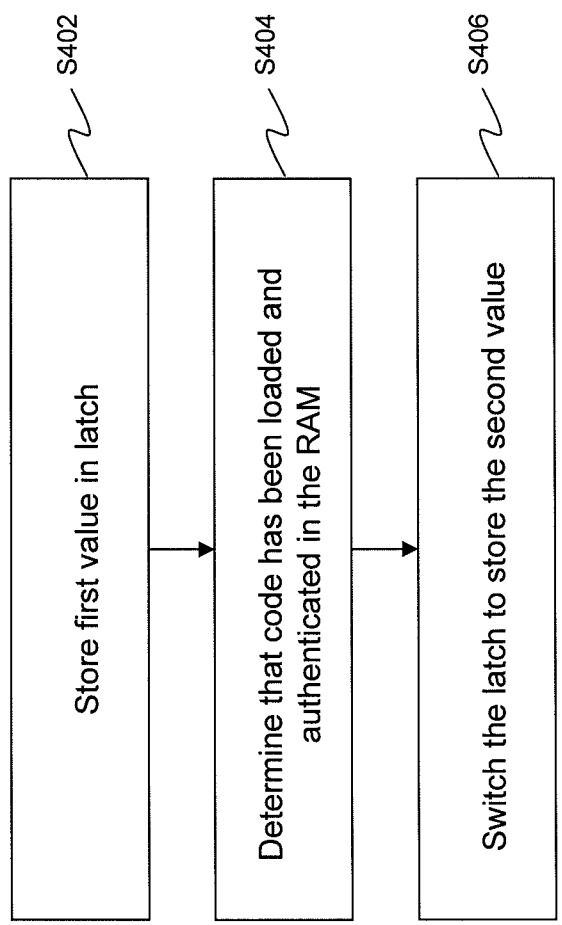
FIG. 4 is a flow chart of a process for using a latch to control a RAM according to a preferred embodiment.

In some embodiments, the switching of access to the code RAM 112 from one-way data-only access (during loading of the Application code) to one-way read only access (after completion of the loading of the Application code and the authentication of the Application code) is implemented using a latch on the chip 102. When the latch 115 stores a first value, data can be read from or written to the code RAM 112 but instructions cannot be executed from it. When the latch 115 stores a second value, instructions can be executed from the code RAM 112 but data cannot be written to it. FIG. 4 shows a flow chart of a process for implementing the switching of the access to a RAM according preferred embodiments. In step S402 when the system 100 is initialized the latch 115 stores the first value. This indicates to the CPU 104 that data can be read from or written to the RAM 112, but instructions cannot be executed from the RAM 112. In step S404, it is determined that the Application code has finished loading into the RAM 112 from the insecure memory 116 and that the authentication of the code in the RAM 112 has been verified. In step S406 the latch 115 is switched to the second value. This indicates to the CPU 104 that instructions can be executed from the RAM 112, but not written to the RAM 112.

Figure 5:
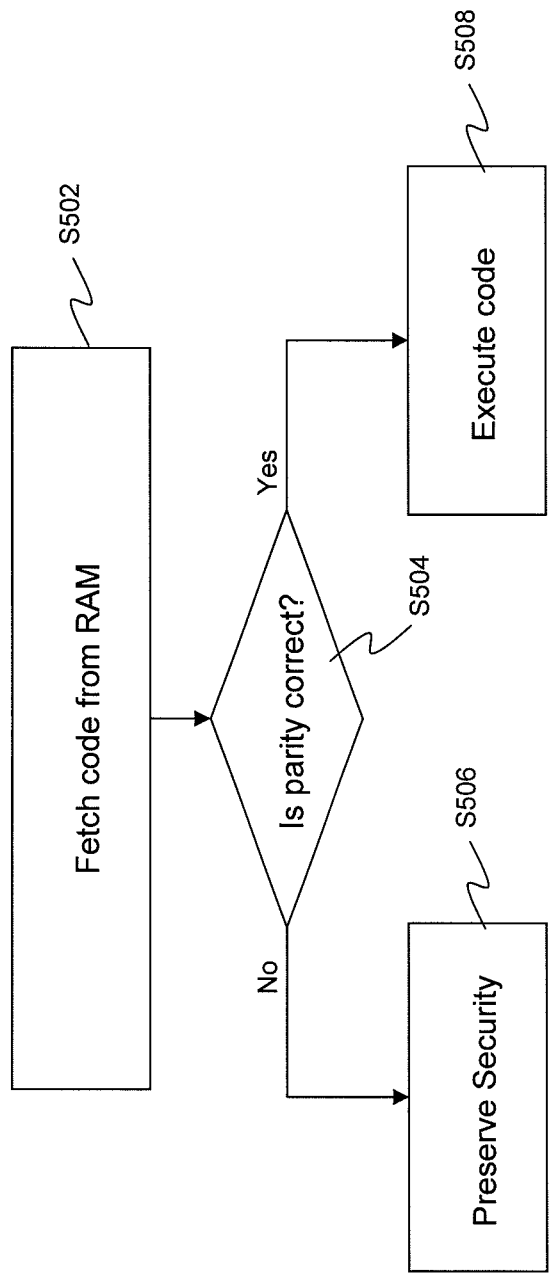
FIG. 5 is a flow chart of a process for fetching code from a RAM according to a preferred embodiment.

With reference to FIG. 5 there is now described a method of fetching Application code from the code RAM 112 according to a preferred embodiment. The Application code is only fetched from the code RAM 112 if the authentication of the code has been verified as described above.

In step S502 the Boot code instructs the CPU 102 to fetch the Application code from the code RAM 112. The fetched Application code and the associated error detection bits are first received at the parity checking block 113 of the parity block 110. The fetched code is fetched in code words.

In step S504 the parity checking block 113 checks the fetched code words of the Application code to determine whether the parity bits of the code words are correct.

If it is detected that the parity of a fetched code word is not correct, then this indicates to the system 100 that the Application code has been altered since the parity bits were generated. Such altered Application code should not be trusted and should not be allowed to be executed on the CPU 102. If it is determined in step S504 that the parity of a fetched code word is not correct then in step S506 the parity checking block 113 takes action to preserve the security of the system 100. For example, the parity block 110 may force a reboot of the chip 102 or cause the CPU 104 to stall.

However, if it is determined in step S504 that the parity bits of the fetched code words are correct then in step S508 the parity checking block 113 allows the instructions of the Application code to be executed by the CPU 104.

As described above, the present invention has advantages over a system in which the Application code is stored in ROM on the chip because it allows the Application code to be developed and improved after manufacture of the device. This allows bugfixes and feature improvements to be provided securely, even in an end-user's home.

Various factors could affect the code loading process which may modify the code as it is written into the code RAM 112. For example, a glitch may occur in which the timing of an operation is too fast for the operation to be correctly performed, or a brown-out may occur in which a power supply is temporarily reduced causing some operations, such as write operations, to malfunction. Write operations are particularly susceptible to factors such as glitches and brown-outs because write operations require a certain level of power and a certain amount of time to be performed correctly. The occurrence of such factors may result in a situation in which code is altered as it is loaded into the RAM. Such altered code may cause the computer system to malfunction.

The present invention advantageously uses error detection bits, such as parity bits which are stored with the Application code in the code RAM 112. As described above the use of such parity bits ensures that the Application code has not been modified since the generation of the parity bits. This helps to ensure that the Application code written into the code RAM 112 is the same as that read out from the insecure memory 116. This provides protection against glitches and brown-outs and other factors which may alter the Application code as it is written into the code RAM 112 as described above. In this way, it is ensured that the contents of the code RAM 112 are correct after they have been written.

Some factors, such as glitches and brown-outs as described above, may alter code as it is fetched from the insecure memory 116 to the parity block 110 on link 117 and bus 114. If the code is altered on link 117 or bus 114 then the integrity of the code would not be verified in the authentication check described above. In this way it would be determined that the code should not be trusted.

Furthermore, the parity bits are generated by the parity block 110 on the chip 102 as the Application code is received from the insecure memory 116. This is preferable to storing the parity bits in the insecure memory with the Application code because the parity bits are not required to be stored in the insecure memory 116, thereby saving memory space in the insecure memory 116. It is desirable to save memory space in the insecure memory 116 since this allows more Application code to be stored there, and/or allows the insecure memory 116 to be smaller, cheaper and faster.

The Boot ROM 108 provides a source of trust for the system 100 since the code in the Boot ROM 108 is very difficult to modify after it has been programmed at design or manufacture. The Boot ROM 108 instructs the CPU to load the Application code from the insecure memory 116, and the authentication check and parity check described above allow the system to ensure that the Application code loaded from the insecure memory 116 is trusted code. In this way, the security of the system is ensured, whilst it is possible to update the Application code by updating the Application code in the insecure memory 116.

One application of the chip 102 is as a set top box (STB) chip for use in decoding content streams transmitted by broadcasters. The present invention provides a suitable mechanism for verifying that code received at a STB chip has come from a trusted source.

In some embodiments, the code stored in the insecure memory 116 may be stored in encrypted form. In these embodiments, the code is decrypted on the chip 102 before it is written into the code RAM 112. In other embodiments, the code stored in the insecure memory 116 is not encrypted so no decryption of the code is necessary on the chip 102 before the code is stored in the code RAM 112.

Figure 6:
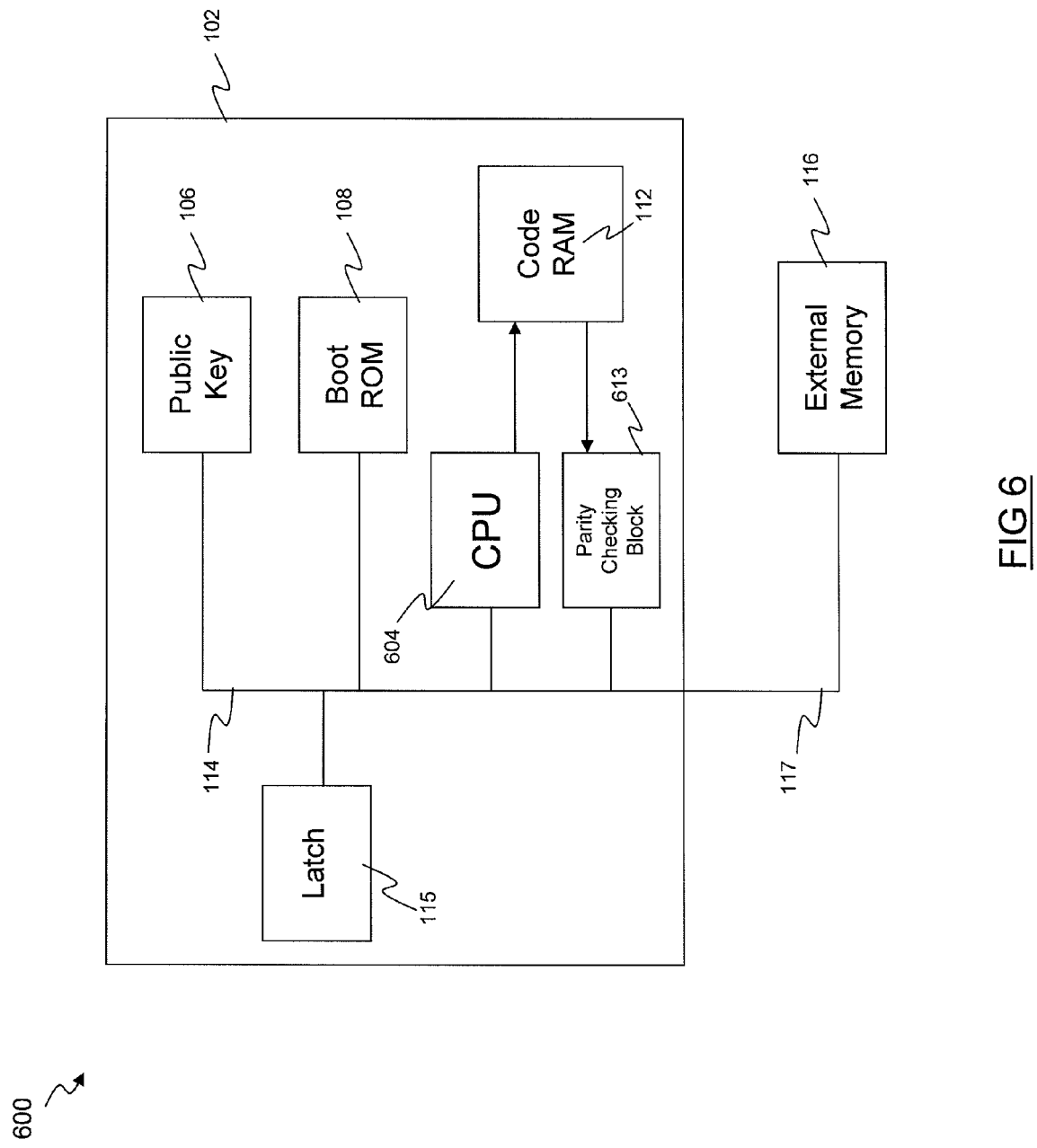
FIG. 6 is a schematic diagram representing a system according to a second embodiment of the present invention.

With reference to FIG. 6 there is now described a system 600 according to a second embodiment of the present invention. Where components are the same as those described above in relation to FIG. 1, like reference numerals have been used in FIG. 6. In the system 600 the parity block does not comprise a parity generation block. Instead, software running on the CPU 604 calculates parity bits. The parity checking block 613 is still implemented in hardware and checks the parity of code and parity bits stored in the code RAM 112 in the same way as described above in relation to parity checking block 113.

In operation, in the system 600, Application code is received via the link 117 at the CPU 604. Software running on the CPU 604 generates error detection bits for each word of the received Application code. The Application code and the generated error detection bits are then stored in the code RAM 112, each fetched word of Application code being stored with associated error detection bits. The rest of the operation of the system 600 is the same as that described above in relation to system 100 of FIG. 1.

It will be appreciated that the above embodiments are described only by way of example. Other applications and configurations may be apparent to the person skilled in the art given the disclosure herein. The scope of the invention is not limited by the described embodiments, but only by the following claims.

What is claimed is:

1. A method of verifying integrity of code in a programmable memory, the method comprising:
    receiving the code from an insecure memory;
    generating error detection bits for the code received from the insecure memory;
    storing the code and the error detection bits in the programmable memory;
    verifying the integrity of the code stored in the programmable memory by performing an authentication check on the code and the error detection bits stored in the programmable memory; and
    if the integrity of the code is verified:
        fetching the code and the error detection bits from the programmable memory;
        determining whether the fetched error detection bits are correct for the fetched code; and
        if it is determined that the fetched error detection bits are correct, executing the fetched code.

2. The method of claim 1, wherein:
    the code comprises a plurality of code words,
    for each code word of the plurality of code words, at least one error detection bit of the error detection bits is generated, and
    each code word of the plurality of code words is stored in the programmable memory in association with the at least one error detection bit generated for the code word.

3. The method of claim 2, wherein each code word from the plurality of code words comprises bits that are accessed in one memory access operation.

4. The method of claim 1, further comprising, if any of the fetched error detection bits are not correct, preventing execution of the fetched code.

5. The method of claim 1, wherein the authentication check comprises:
    calculating a first hash of the code and the error detection bits stored in the programmable memory;
    comparing the first hash with a second hash calculated from the code stored in the insecure memory and error detection bits calculated from the code stored in the insecure memory; and
    when the first hash matches the second hash, determining that the code is trusted and the integrity of the code is verified.

6. The method of claim 5, wherein the authentication check is a signature check, whereby the second hash is encrypted using a first key, and performing the signature check comprises decrypting the second hash with a second key.

7. The method of claim 6, wherein the programmable memory is on a chip, the insecure memory is an off-chip memory external to the chip, and the error detection bits are generated on the chip.

8. The method of claim 7, wherein the first key is a private key stored off the chip, and the second key is a public key stored on the chip, the private key corresponding to the public key.

9. The method of claim 1, wherein the error detection bits are parity bits.

10. The method of claim 1, wherein the code is stored in the insecure memory in an encrypted form and the method further comprises decrypting the code before storing the code in the programmable memory.

11. The method of claim 1, wherein at least one processor is not allowed to execute the code before the integrity of the code has been verified.

12. The method of claim 11, wherein, after the code has been stored in the programmable memory and the integrity of the code has been verified, only read access to the programmable memory is allowed and the at least one processor is allowed to execute the code.

13. The method of claim 12, wherein:
    the at least one processor is not allowed to execute the code when at least one component stores a first value; and
    the at least one processor is allowed to execute the code stored in the programmable memory and only read access to the programmable memory is allowed when the at least one component stores a second value.

14. A chip comprising:
    means for receiving code from an insecure memory;
    means for generating error detection bits for the code received from the insecure memory;
    a programmable memory for storing the code and the error detection bits;
    means for verifying the integrity of the code stored in the programmable memory by performing an authentication check on the code and the error detection bits stored in the programmable memory;

means for fetching the code and the error detection bits from the programmable memory if the integrity of the code is verified;

means for determining whether the fetched error detection bits are correct for the fetched code; and means for executing the fetched code if it is determined that the fetched error detection bits are correct.

15. The chip of claim 14, wherein the means for generating error detection bits and the means for checking that the fetched error detection bits are correct comprise a parity block.

16. The chip of claim 15, wherein the insecure memory is an off-chip memory.

17. The chip of claim 16, further comprising a boot ROM which comprises computer readable instructions for loading the code from the insecure memory into the programmable memory.

18. A system comprising:
a chip comprising:
at least one first component for receiving code from an insecure memory;
at least one second component for generating error detection bits for the code received from the insecure memory;
a programmable memory for storing the code and the error detection bits;
at least one third component for verifying the integrity of the code stored in the programmable memory by performing an authentication check on the code and the error detection bits stored in the programmable memory; and
at least one processor for:
when the integrity of the code has been verified, fetching the code and the error detection bits from the programmable memory; and
when it is determined that the fetched error detection bits are correct, executing the fetched code.

19. The system of claim 18, wherein the authentication check comprises:
calculating, at the chip, a first hash of the code and the error detection bits stored in the programmable memory;
comparing the first hash with a second hash calculated from the code stored in the insecure memory and error detection bits calculated from the code stored in the insecure memory; and
when the first hash matches the second hash, determining that the code is trusted and the integrity of the code is verified.

20. The system of claim 19, further comprising a public key stored on the chip, wherein:
the second hash is encrypted using a first key, and
performing the signature check comprises decrypting the second hash with the public key.

21. The system of claim 20, wherein:
the first key comprises a private key stored externally to the chip, and
the private key corresponds to the public key.

22. The system of claim 18, wherein:
the code comprises a plurality of code words,
for each code word of the plurality of code words, at least one error detection bit of the error detection bits is generated, and
each code word of the plurality of code words is stored in the programmable memory in association with the at least one error detection bit generated for the code word.

23. The system of claim 18, wherein, when it is determined that at least one of the fetched error detection bits is incorrect, execution of the fetched code is prevented.

24. The system of claim 18, wherein the chip further comprises at least one fourth component for determining that the fetched error detection bits are correct for the fetched code.

25. The system of claim 24, wherein the at least one fourth component comprises a parity checking component.

26. The system of claim 18, wherein the at least one processor is not allowed to execute the code before the integrity of the code has been verified.

27. The system of claim 26, wherein, after the code has been stored in the programmable memory and the integrity of the code has been verified, only read access to the programmable memory is allowed and the at least one processor is allowed to execute the code.

28. The system of claim 27, further comprising an indicator component for storing a first value to indicate that the at least one processor is not allowed to execute the code or storing a second value to indicate that the at least one processor is allowed to execute the code stored in the programmable memory and only read access to the programmable memory is allowed.

29. The system of claim 18, further comprising the insecure memory.

30. The system of claim 18, wherein the chip comprises a set top box chip for decoding content streams transmitted by at least one third party.

31. A computer-readable storage medium encoded with computer-executable instructions for performing, when executed by at least one processor, a method of verifying integrity of code in a programmable memory, the method comprising:
receiving the code from an insecure memory;
generating error detection bits for the code received from the insecure memory;
storing the code and the error detection bits in the programmable memory;
verifying the integrity of the code stored in the programmable memory by performing an authentication check on the code and the error detection bits stored in the programmable memory; and
if the integrity of the code is verified:
fetching the code and the error detection bits from the programmable memory;
determining whether the fetched error detection bits are correct for the fetched code; and
if it is determined that the fetched error detection bits are correct, executing the fetched code.

32. The computer-readable storage medium of claim 31, wherein:
the code comprises a plurality of code words,
for each code word of the plurality of code words, at least one error detection bit of the error detection bits is generated, and
each code word of the plurality of code words is stored in the programmable memory in association with the at least one error detection bit generated for the code word.

33. The computer-readable storage medium of claim 31, wherein the method further comprises, if any of the fetched error detection bits are not correct, preventing execution of the fetched code.

34. The computer-readable storage medium of claim 31, wherein the authentication check comprises:
calculating a first hash of the code and the error detection bits stored in the programmable memory;

comparing the first hash with a second hash calculated from the code stored in the insecure memory and error detection bits calculated from the code stored in the insecure memory; and when the first hash matches the second hash, determining that the code is trusted and the integrity of the code is verified.

35. The computer-readable storage medium of claim 34, wherein the authentication check is a signature check, and the second hash is encrypted using a first key, and performing the signature check comprises decrypting the second hash with a second key.

36. The computer-readable storage medium of claim 35, wherein the programmable memory is on a chip, the insecure memory is an off-chip memory external to the chip, and the error detection bits are generated on the chip.

37. The computer-readable storage medium of claim 36, wherein the first key is a private key stored off the chip, and the second key is a public key stored on the chip, the private key corresponding to the public key.

38. The computer-readable storage medium of claim 31, wherein the error detection bits are parity bits.

39. The computer-readable storage medium of claim 31, wherein the code is stored in the insecure memory in an encrypted form and the method further comprises decrypting the code before storing the code in the programmable memory.

* * * * *